(12) United States Patent
Allen et al.

(10) Patent No.: US 9,915,046 B2
(45) Date of Patent: Mar. 13, 2018

(54) SELF ALIGNMENT STRUCTURE FOR APPLICATIONS JOINING EXTRUDED MEMBERS

(71) Applicant: HFW Solutions, Inc., Rapid City, SD (US)

(72) Inventors: Casey Dean Allen, Rapid City, SD (US); Bryan Matthew Tweedy, Rapid City, SD (US)

(73) Assignee: HFW Solutions, Inc., Rapid City, SD (US)

( * ) Notice: Subject to any disclaimer, the term of this patent is extended or adjusted under 35 U.S.C. 154(b) by 62 days.

(21) Appl. No.: 14/968,909

(22) Filed: Dec. 15, 2015

(65) Prior Publication Data

US 2017/0167090 A1 Jun. 15, 2017

(51) Int. Cl.

| E01D 19/00 | (2006.01) |
|---|---|
| E01D 19/12 | (2006.01) |
| E01D 21/00 | (2006.01) |
| B21C 23/00 | (2006.01) |
| B23K 20/12 | (2006.01) |
| B23K 101/24 | (2006.01) |
| B23K 103/10 | (2006.01) |
| E01D 101/34 | (2006.01) |

(52) U.S. Cl.
CPC ............ *E01D 19/125* (2013.01); *B21C 23/00* (2013.01); *E01D 21/00* (2013.01); *B23K 20/122* (2013.01); *B23K 2201/24* (2013.01); *B23K 2203/10* (2013.01); *E01D 2101/34* (2013.01)

(58) Field of Classification Search
CPC ... E01D 19/125; E01D 21/00; E01D 2101/34; B23K 20/122; B23K 2201/24; B23K 2203/10; B21C 23/00

USPC .................... 14/73, 73.1; 52/592.1
See application file for complete search history.

(56) References Cited

U.S. PATENT DOCUMENTS

| 2,383,761 A | | 8/1945 | Benton | |
|---|---|---|---|---|
| 3,066,771 A | | 12/1962 | Wolchuk | |
| 3,742,672 A | * | 7/1973 | Schaeufele | E04B 1/54 52/592.1 |
| 3,984,961 A | * | 10/1976 | Chieger | B65D 90/026 404/35 |
| 3,999,346 A | * | 12/1976 | Fetherston | E04B 5/10 52/474 |
| 4,569,615 A | * | 2/1986 | Goldman | E01D 19/06 14/73.1 |

(Continued)

FOREIGN PATENT DOCUMENTS

WO 2001028732 A1 4/2001

*Primary Examiner* — Raymond W Addie
(74) *Attorney, Agent, or Firm* — Gordon Rees Scully Mansukhani, LLP

(57) ABSTRACT

A self alignment structure for joining extruded members. The self-aligning structure includes one or more decking members including an upper panel and a lower panel connected by webbing members. One side of the decking member has a void space between the upper panel and lower panel and another side the decking member may have a vertical webbing member between the upper panel and the lower panel. The self aligning structure further includes an upper shelf and lower shelf, each shelf extending horizontally relative to the vertical webbing member. The shelves being operable to align a neighboring decking member, forming abutment joints in preparation for a friction stir welding process.

20 Claims, 5 Drawing Sheets

(56) References Cited

U.S. PATENT DOCUMENTS

| | | | | |
|---|---|---|---|---|
| 4,709,435 A | * | 12/1987 | Stemler | ................ E01D 19/125 |
| | | | | 14/73 |
| 5,033,147 A | | 7/1991 | Svensson | |
| 5,617,599 A | | 4/1997 | Smith | |
| 5,713,507 A | | 2/1998 | Holt et al. | |
| 5,836,029 A | | 11/1998 | Garber et al. | |
| 6,029,879 A | | 2/2000 | Cocks | |
| 6,591,567 B2 | * | 7/2003 | Hota | .................... B29C 65/342 |
| | | | | 14/13 |
| 6,779,705 B2 | * | 8/2004 | Ezumi | ................. B23K 20/123 |
| | | | | 228/112.1 |
| 6,895,622 B2 | * | 5/2005 | Szekely | ................. E01C 11/24 |
| | | | | 14/69.5 |
| 7,114,304 B2 | * | 10/2006 | Aota | .................... B23K 20/122 |
| | | | | 228/112.1 |
| 7,665,269 B2 | * | 2/2010 | Azar | ........................ E04B 2/16 |
| | | | | 52/592.1 |
| 9,468,990 B2 | * | 10/2016 | Osikowicz | ......... B23K 20/1255 |
| 2005/0001009 A1 | | 1/2005 | Raether et al. | |
| 2014/0119814 A1 | | 5/2014 | Osikowicz | |

* cited by examiner

SELF ALIGNMENT STRUCTURE FOR APPLICATIONS JOINING EXTRUDED MEMBERS

FIELD

The present disclosure relates generally to structures and methods for self-aligning bridge decking members to be joined through various methods including, without limitation, fusion welding, friction stir welding, and mechanical fastening applications.

BACKGROUND

Bridge decking is relatively well known. Typically, bridge decking includes two panels or skins lying in a generally horizontal plane (or other intended plane of roadway), parallel to one another. The skins are spaced vertically apart by internal vertical, slanted, trapezoidal, or triangular members similar in nature to the way webbing spaces two horizontal surfaces in I-beams. The internal webbing serves to distribute loads imparted on the horizontal surfaces. Additionally, the webbing rigidly resists deflection and torsion resulting from the loads imparted on the horizontal panels.

Creating bridge decking from lightweight metals, such as aluminum, is advantageous for several reasons. Decreasing the weight of decking in a bridge structure may allow for increased service loads. Aluminum bridge decking can be prefabricated in modular units and joined together on site when placed in service. Aluminum bridge decking is more easily transported that heavier metals or preformed concrete. Aluminum bridge decking may be employed in new structures, or it may be used to refurbish an aging bridge structure.

Modular bridge decking members are typically joined at their vertical seam abutments by various welding, filling, or fastening methods. Welding the decking faying surfaces (abutments) typically provides for more rigidity and increased load distribution, whereas non-welded fasteners allow enhanced and semi or fully-independent movement as between modular decking members under changing load conditions. In applications where welded joints are desired, the use of friction stir welding ("FSW") techniques has developed as one possible method for joining the members.

Friction stir welding generally includes the application of a pin or probe to the surface of a joint or seam. The pin applies pressure and fiction, typically by spinning, on the seam sufficient to cause the metal of the faying surface to plasticize. The pin may be separately heated, but typically is designed to cause the metal to plasticize purely as a result of pressure without the need for additional heat or electricity. The pin moves along the length of the faying surface, and the plasticized metals from adjoining members are effectively "stirred" and intermix in the void created by the pin movement, thereby creating a weld seam. Additional filler material is typically unneeded. Because the yield strength threshold for various metals are usually well known, the FSW tool and pin can be precisely calibrated to apply no more than the exact pressure needed to cause the metal to plasticize and weld. This precise calibration also means that the weld joint cools and hardens almost immediately after the pin has passed a point in the faying surface. This results in a relatively instant weld without the application of broader heat, which can cause unwanted deformations.

In certain applications, the application of force from an FSW pin may be problematic. For example, where the desire is to join the abutments of horizontal panels in bridge decking, the application of a pin from above a panel, and the corresponding vertical pressure, can cause unwanted deformation in the decking panel. To solve this problem, developments have included the use of a pin with both an upper and lower shelf on either side of the welding probe. Rather than applying pressure perpendicularly to the panel surface, the FSW pin is instead applied to the abutment joint from a position parallel to the seam (i.e., from the side of the panel). Through this orientation, force perpendicular to the plane of panel is removed. Said dual-shoulder arrangement is described, for example, in U.S. Patent Publication No. 2014/0119814 A1. However, having a second shoulder on the distal end of a welding pin means that abutments must be located in flanged areas of the decking free from any obstructions intersecting with the flanged panels. This limitation means that the weld area is located in a region of the decking that is less stable as compared to other possible locations. For example, if it is possible for the faying surface to be in a location of the decking at, or close to the intersection of internal deck webbing members, the welds would be subject to a smaller torque moment, because the shorter span to transfer vertical load to the webbing members.

Aluminum decking panels are typically extruded or rolled. Although current methods for manufacturing aluminum decking are relatively precise, inconsistencies persist nonetheless. For example, aluminum panels may vary somewhat in thickness or extend away from webbing intersections at slight angles. Thus, when the decking members are intended to be joined at the abutments, these inconsistencies can make welding difficult.

Additionally, traditional FSW techniques impart not only axial forces normal to the plane of the abutment flanges, but FSW effectively imparts lateral forces as well. When an FSW pin imparts pressure on the panel abutments, each of the members naturally bias toward spreading apart. Accordingly, a successful FSW joint requires the user to precisely align the decking members and prevent them from spreading apart. However, given the typical arrangement of blunt faying surfaces, the addition of lateral alignment pressure can force the faying surfaces to shift vertically or laterally relative to the other, thereby creating the potential for a mismatched seam.

Accordingly, a need exists for a structure and method for joining bridge decking with FSW techniques without the need for manual alignment and without risk of causing mismatched seams.

SUMMARY

The following simplified summary is provided in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In some embodiments, the self-alignment structure is a single bridge decking member that is may be replicated and thereafter interconnected. However, improvements of the self-alignment structure can all be found in a single bridge decking member. Moreover, the improvements of the self-aligning structure disclosed herein may be employed between members of dissimilar shapes, for example a decking member with greater width may be self-aligned through the alignment structure with another decking member having a smaller width. By way of another example, a decking member used for a central part of a bridge or roadway may have certain physical characteristics and/or spatial geometries which differ from other members used for distal regions of a bridge which may accommodate shoulders, gutters, or guardrails. Nonetheless, such differing members can be interconnected through the use of the self-alignment structures disclosed herein.

For example, these embodiments employ a self-alignment structure comprising one or more bridge decking members including and upper panel and a lower panel connected by webbing members therebetween. One side of the bridge decking member may have a void space between the upper panel and lower panel and an other side the decking member may have a vertical webbing member between the upper panel and the lower panel. The self aligning structure may further include an upper shelf and lower shelf, each extending horizontally away from the vertical webbing member, operable to align a neighboring decking member, thereby forming abutment joints in preparation for the application of a friction stir welding tool.

Alternatively, in some embodiments, the self-alignment structure is intended to encompass a plurality of self-aligned bridge decking members. In these embodiments, the various aspects of the improvements disclosed herein are identified as operable relative to one another.

In these embodiments, for example, the self-aligning structure comprises a first bridge decking member and a second decking member, each having an upper panel and a lower panel connected by webbing members therebetween. The upper and lower panels of each bridge decking member further comprise flanges which extend away from the center of the decking members. These flanges further comprise ends, which form abutment joints with each flange of the neighboring member. In one embodiment, the first decking member may further comprise an upper shelf extending horizontally beneath the abutment joint formed by the upper flanges and a lower shelf extending horizontally above the abutment joint formed by the lower flanges. Moreover, the upper and lower shelves may be connected by a vertical webbing member therebetween. Additionally, each decking member may have a void space between the upper panel and lower panel of each decking member, wherein the void space of one decking member is spanned by the vertical webbing member and upper and lower shoulders of the other decking member. According to an aspect, the upper shelf of the first member may have an upwardly facing horizontal face in contact with the lower surface of the upper flange of the second member. Similarly, the lower shelf of the first member may have a downwardly facing horizontal face that is in contact with the upper surface of the lower flange of the second member.

To accomplish the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

DETAILED DESCRIPTION

The features of the present disclosure may be economically constructed by using one or more distinct parts and associated components which, when assembled together, may form the disclosed device regardless of the particular form. Unless defined otherwise, all terms of art, notations and other scientific terms or terminology used herein have the same meaning as is commonly understood by one of ordinary skill in the art to which this invention belongs.

In some cases, terms with commonly understood meanings are defined herein for clarity and/or for ready reference, and the inclusion of such definitions herein should not necessarily be construed to represent a substantial difference over what is generally understood in the art. All patents, applications, published applications and other publications referred to herein are incorporated by reference in their entirety. If a definition set forth in this section is contrary to or otherwise inconsistent with a definition set forth in the patents, applications, published applications and other publications that are herein incorporated by reference, the definition set forth in this section prevails over the definition that is incorporated herein by reference.

As used herein, "a" or "an" means "at least one" or "one or more."

The structure and methods described herein for automatically aligning bridge decking members for FSW applications can now be better understood turning to the following detailed description. It is to be expressly understood that the illustrated embodiments are set forth as examples and not by way of limitations on the embodiments as ultimately defined in the claims.

Figure 1:
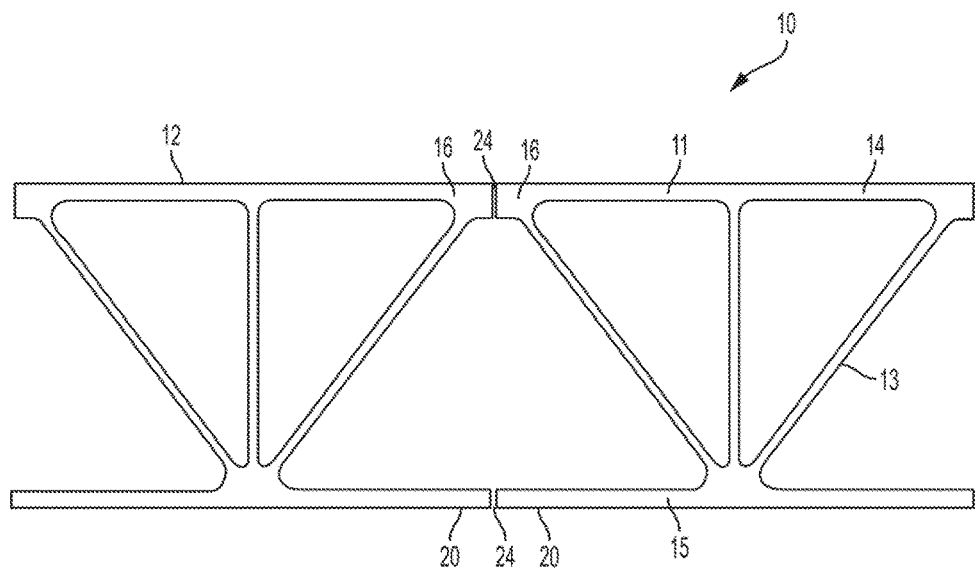
FIG. 1 is a vertical elevation view of typical abutment joints in known bridge decking.
Figure 2:
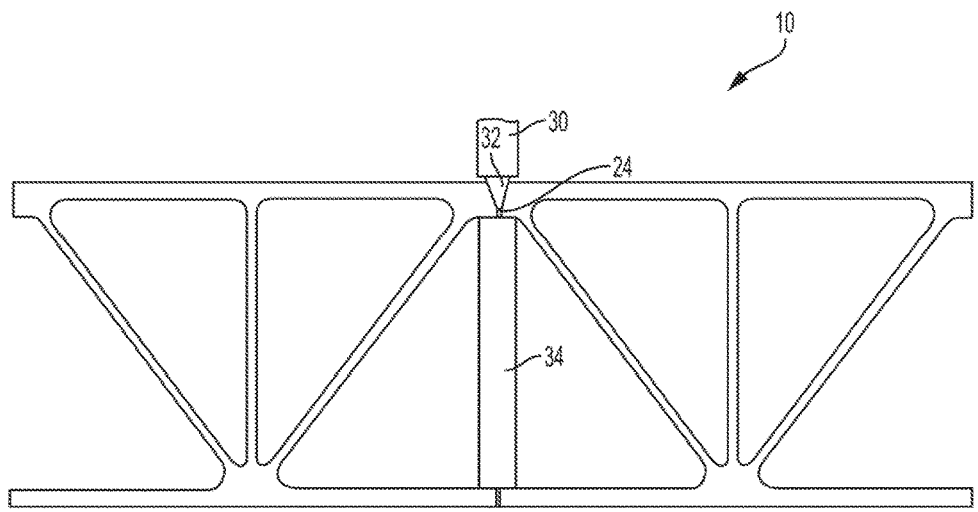
FIG. 2 is an exemplary vertical elevation view of an FSW pin being applied to the surface of an upper panel of a typical abutment joint in known bridge decking with an anvil beneath the upper surface.

Turning to FIG. 1 is a vertical elevation view of typical abutment joints in known bridge decking. FIG. 1 illustrates a bridge decking arrangement 10 for FSW applications through the extrusion profile. FIG. 1 illustrates ideal conditions for joining blunt abutments under the typical bridge decking arrangement for aligning members to be joined via FSW. Typical FSW bridge alignment calls for at least a first bridge decking member 12 and a second bridge decking member 14. Each member 12, 14 comprises at least an upper surface 11 and a lower surface 15 which are separated by internal walls 13 connecting the upper surface 11 to the lower surface 15. As used herein, either upper or lower surfaces 11, 15 may be referred to alternatively as upper or lower plates 11, 15. Also as used herein, the internal walls 13 may be referred to as webbing 13, or internal webbing 13. As seen in FIG. 1, internal webbing 13 may extend vertically or at an angle as between upper and lower plates 11, 15. The regions of the upper and lower plates 11, 15 extending laterally away from the center regions of the plates and intended to abut another bridge decking member are referred to as flanges 16, 20. As seen in FIG. 1, each upper flange 16 and each lower flange 20 further comprises a blunt vertical surface 24. In this application, each member 12, 14 are aligned so that each blunt vertical surface 24 of each respective upper and lower flange 16, 20 are in physical contact prior to the application of FSW. As seen in FIG. 2, the typical member alignment 10 of FIG. 1 is intended for an FSW tool 30 to be applied to weld the blunt vertical surfaces 24 together.

Turning to FIG. 2, is an exemplary vertical elevation view of the application of an FSW pin 32 to upper panels of two bridge decking members. As used herein, the blunt vertical surfaces 24 of each upper and lower flange 16, 20 may also be referred to as faying surfaces 24, or collectively, abutment joint 24. Once welding is complete, the joined region may be referred to as a weld line 24. As shown in FIG. 2, an FSW tool 30 comprises a pin 32 which imparts vertical and rotational frictional pressure on the faying surface 24 of the upper flange 16 of each bridge decking member 12, 14. In order to counteract the vertical pressure of the FSW tool 30, an anvil 34 has been temporarily placed beneath the upper flanges 16 of each bridge decking member 12, 14. The anvil 34 further distributes the vertical pressure from the FSW tool 30 to the lower panels 15 of each bridge decking member 12, 14 and thereon to any surface by which the members 12,14 are supported (not depicted). In application, the members 12, 14 and the FSW tool 30 must move in opposite directions relative to one another. Effectively, the FSW tool traverses across the members 12, 14. In the embodiment of FIG. 2, for example, the FSW tool 30 moves along the path of the faying surface 24 in the direction of the extrusion profile.

In the FSW application illustrated by FIG. 2, either a second FSW tool 30 is required to join the faying surfaces 24 of the lower flanges 20, or else, (i) the FSW tool must be able to articulate beneath the members 12, 14, or (ii) the decking members 12, 14 must be rotated over to the other side and realigned so the FSW tool 30 can be reapplied.

Figure 3:
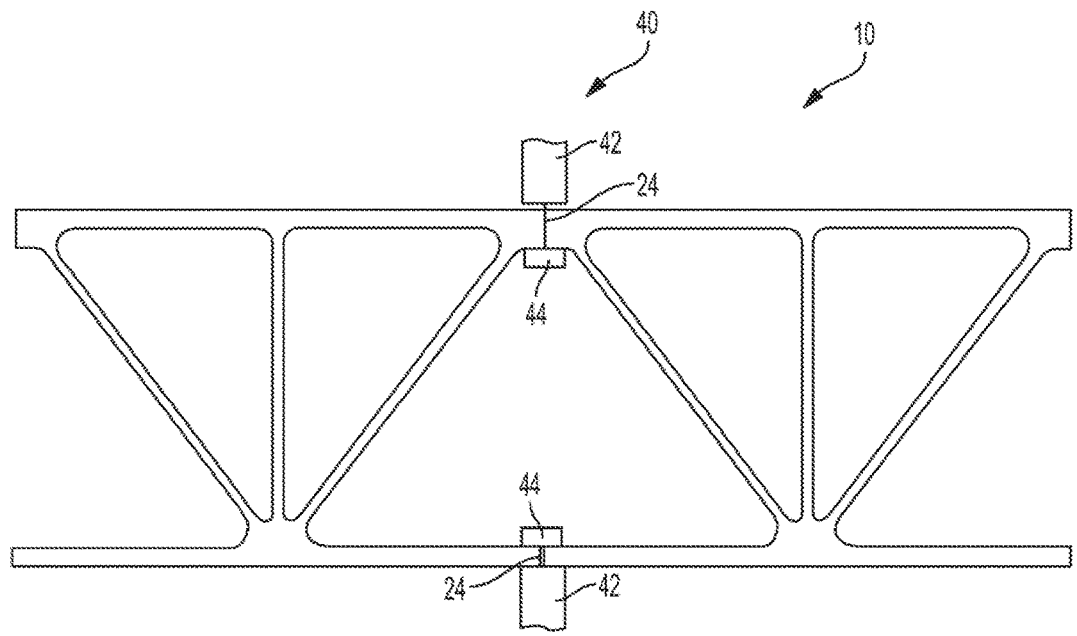
FIG. 3 is an exemplary vertical elevation view of two self-reacting FSW tools applied to both upper panels and lower panels of a typical abutment joint in known bridge decking.

Turning to FIG. 3, which again views two bridge decking members 12, 14 through the extrusion profile, is an exemplary vertical elevation view of two self reacting FSW tools 40 applied to both an upper panel and a lower panel of typical abutment joints in bridge decking members. In the embodiment disclosed by FIG. 3, each FSW tool 40 comprises a "self-reacting" pin (not visible). A self-reacting FSW tool 40 generally refers to an FSW tool having a proximal shoulder 42 and a distal shoulder 44 and a self-reacting pin (not visible) therebetween. The self-reacting pin of FSW tool 40 is not visible in FIG. 4 because it has progressed deeper into the extrusion profile of the faying surface, leaving only the weld line 24 of the joined flanges 16, 20 of the members 12, 14 in view.

The shoulders 42, 44 of the self-reacting FSW tool 40 obviate the need for a support anvil, as seen in FIG. 2, because the pressure imparted on the flanges 16, 20 of the upper and lower panels 14, 15 is not vertical. Instead, the self-reacting FSW tool 40 engages the flanges 16, 20 laterally and imparts pressure in direction of the plane of the faying surface 24. Accordingly, the flanges 16, 20, are not subject to a normal force and don't suffer from a bending moment. Each shoulder 42, 44 of the self reacting tool 40 is in close contact with the surfaces of the flanges 16, 20 which prevents the plasticized material from spreading away from from the weld line 24. By preventing the plasticized material from evacuating the abutment joint 24, the shoulders 42, 44 of the self reacting FSW tool 40, aim to ensure a more consistent weld line 24 and an overall stronger connection.

Figure 4:
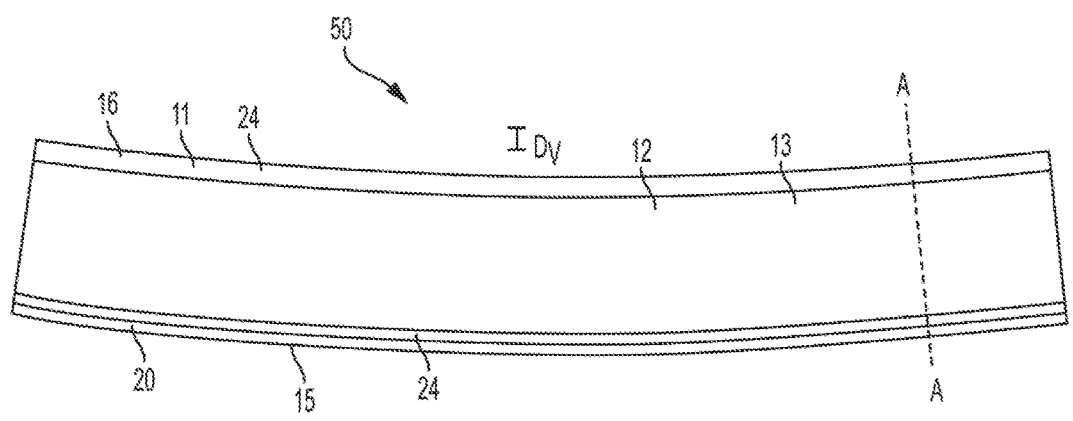
FIG. 4 is an exaggerated vertical elevation view of known bridge decking suffering vertical deformity resulting from the manufacturing extrusion process.

Turning to FIG. 4, is a vertical elevation view of the horizontal length L of typical bridge decking suffering an exaggerated vertical deformity 50 as a result of the extrusion manufacturing process. Although the typical aluminum extrusion process is relatively precise, certain inconsistencies remain. For example, differences in material composition may exist as between one piece of raw material and another. Also, finished extruded members may be grouped together although they may have come from different source batches of raw materials. The extrusion process further imparts heat and pressure in forcing the raw materials through a desired die configuration. Any of the foregoing factors may influence a final member with geometric imperfections, such as vertical deformities, oscillations, twists, and turns. In FIG. 4, the length of the extrusion profile L is seen in a generally horizontal plane. The elevation of internal webbing 13 spanning the length of a member 12 is also in view. Exemplary, but unjoined vertical abutment joints 24 of upper and lower panel 11, 15 are in view, extending the length L of member 12. Cut line A-A defines the plane by which embodiments herein are viewed through the extrusion profile, such as in FIGS. 1, 2, 3, 6, 7, and 8.

When deformations are present in finished extruded members, it can pose a challenge to apply FSW methods to typical bridge decking members. As seen in FIG. 4, vertical deformation $D_V$ is the distance by which a portion of the member has deflected vertically as compared to a reference point on the member. As seen in FIG. 4, the central region of the member 12 has deflected vertically downward as compared to the end regions causing vertical deformation $D_V$.

Vertical deformation $D_V$ can further be caused by or worsen as a consequence of vertical pressure imparted on the member 12 from an FSW tool 30 and translating along the length L of the abutment joints 24. Vertical deformity $D_V$ can be caused or worsen as a consequence of the plasticized material hardening along a weld line 24. In this scenario, for example, an FSW pin 32 of an FSW tool 30 is applied vertically to the abutment joint 24 of the flanges 16 of upper panels 11 between a first member 12 and second member 14. The FSW pin 32 thereon plasticizes material on the faying surface 24. The FSW tool 30 and pin 32 translate through the extrusion profile, along length L. As the faying surface 24 material is plasticized, the void space created by translation of the FSW pin 32 is filled both by the intermixing of the plasticized material, as well as the lateral pressure imparted by outside alignment forces. As the intermixed plasticized material cools, the material constricts, which creates tension on the upper flange 16 of panel 11. Because flange 16 of the upper panel 11 has less depth as compared to width, the panel tends to deform upwardly as the cooling of plasticized material creates tension. As the FSW tool 30 translates down the length L of the extrusion profile, the upward deformity caused by tension and the downward deformity caused by vertical pressure from the FSW tool 30 causes a greater deflection until the FSW tool 30 reaches approximately the central region on the length L of the span of the decking member 12. At this point, the members 12, 14 are subject to maximum torque moment from the normal force of the FSW tool 30 being in the center of length L of the span. As the FSW tool 30 continues to translate down the length L of the extrusion profile further, the bending moment lessens, and with it, the deflection lessons also. Ultimately, this results or worsens a vertical deformity $D_V$ in or along length L of the span of the members.

Vertical deformity $D_V$ is undesirable when constructing bridge decking because it results in further mismatches at other abutments as additional members are added to the decking. Moreover, Vertical deformities create problems related to other materials added to create a finished road surface. Vertical deformities can additionally cause water to pool in areas of the decking after rain evens or cause for pockets of snow to harden, which can result in an unsafe road conditions for drivers.

Figure 5:
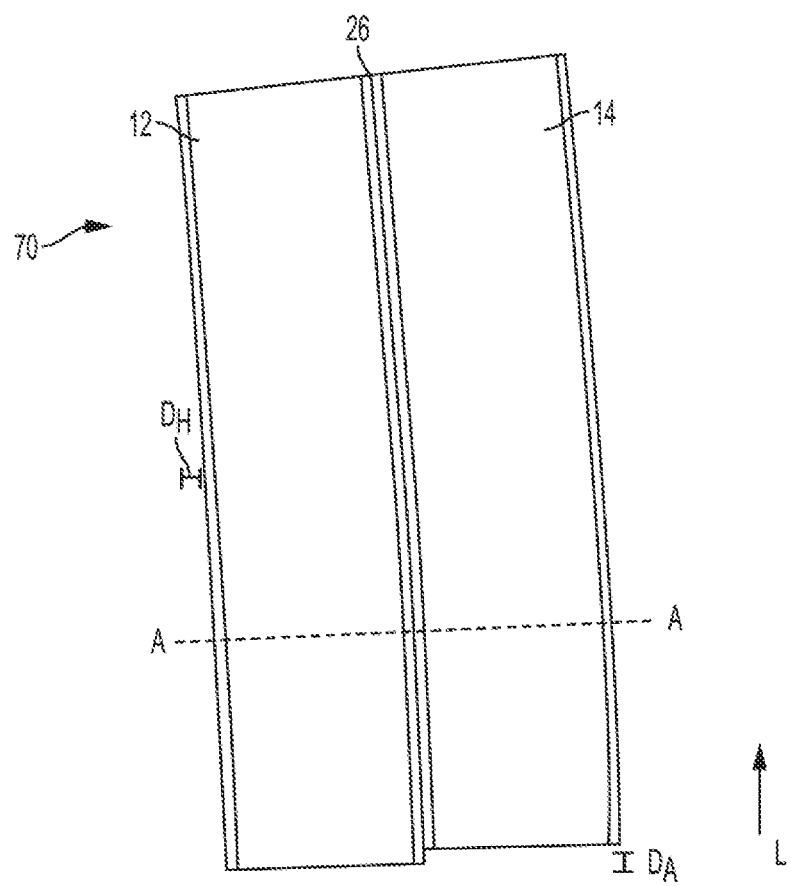
FIG. 5 is a top plan view of bridge decking members positioned side by side, suffering from both horizontal and axial deformities resulting from the manufacturing extrusion process.

Turning to FIG. 5, is a plan view of the of the horizontal length L of typical bridge decking suffering an exaggerated horizontal deformity 70 as a result of the extrusion manufacturing process. In FIG. 5, the length of the extrusion profile L along a horizontal plane is seen from a plan view perspective. The top panels 11 of the first member 12 and second member 14 are in view. Additionally visible between the top panels is a completed FSW weld line 24 running the length of length L between members 12 and member 14 along the flanges 16, which have now been joined. Cut line A-A defines the plane by which embodiments herein are viewed through the extrusion profile, such as in FIGS. 1, 2, 3, 6, 7, and 8.

When horizontal deformations are present in finished extruded members, it can pose a challenge to apply typical FSW methods. As seen in FIG. 5, vertical deformation $D_H$ is the distance by which the members have deflected horizontally as compared to a reference point. As seen in FIG. 5, the central region of the members 12, 14 have deflected horizontally outward as compared to the end regions, causing horizontal deformation $D_H$.

In addition to the inconsistencies imparted by the extrusion process, as discussed above, horizontal deformation $D_H$ can also form or be aggravated by outside alignment pressure imparted on the members 12, 14. In this scenario, outside pressure is imparted on the members 12, 14 to align the abutment joints 24. By pressing the abutment joint 24 of first member 12 against the abutment joint 24 of second member 14, the upper panels 11 are in compression. When a traditional or self-reacting FSW tool 30, 40 is applied and thereafter translated along the length L of the abutment joints 24, the weld areas begin to plasticize, intermix, and fill the void space left by the FSW pin. Because plasticized areas do not counteract compressive forces imparted through the panels 11 as well as hardened areas, some movement occurs. Also, because only small areas are experiencing plasticization at any given time (i.e. the FSW pin only causes a local region to plasticize), only that area will be vulnerable to movement as a result of outside compressive alignment forces. Thus, as the FSW tool translates on the length L of the abutment joints, small movements occur as the faying surfaces 24 of the members 12, 14 intermix and cool to form weld lines 24. Because theses small movements do not occur uniformly across the length L of the members 12, 14 it results in an ongoing series of local area movement caused by outside compressive forces. The local area movement can cause the remaining regions of the members 12, 14 to mis-align. Thus, when the FSW tool reaches the next proximate region, additional compressive forces are needed to maintain the abutment joints 24 in contact, which causes bending, and whereupon local plasticization and subsequent cooling, fuses the horizontal deformity $D_H$ in place.

The extrusion manufacturing process, may cause panels to experience axial deformity $D_A$. Many extrusion manufacturing processes include the application of cutting devices, which are applied to extruded members simultaneously traveling across one or more conveyor belts. Accordingly, such processes can introduce additional imperfections which may cause the lengths of members to be inconsistent. Axial deformity $D_A$ is the distance by which the length L of a first member 12 extends beyond the length L of a second member 14.

Axial deformity $D_A$ can also result from the horizontal deformity $D_H$ of the joined panels. Horizontal deformity $D_H$ may result in members 12, 14 being curved. Just as the perimeter of a circle will be greater the larger its radius, likewise, an outer curved member 14 would have to be longer to span the same arc angle covered by an inner curved member 12. However, because members 12, 14 are of equal lengths, the curve imparted by horizontal deformity $D_H$ may also result in axial deformity $D_A$ as between the inside curved member 12 and outside curved member 14.

Axial deformities $D_A$ and horizontal deformities $D_H$ are undesirable when constructing bridge decking because they result in further mismatches with other abutments as additional members are added to the decking. The self-aligning structures disclosed herein serve to overcome the weld alignment problems caused by such deformities and therefore permit for greater consistency in the application of such welds.

Figure 6:
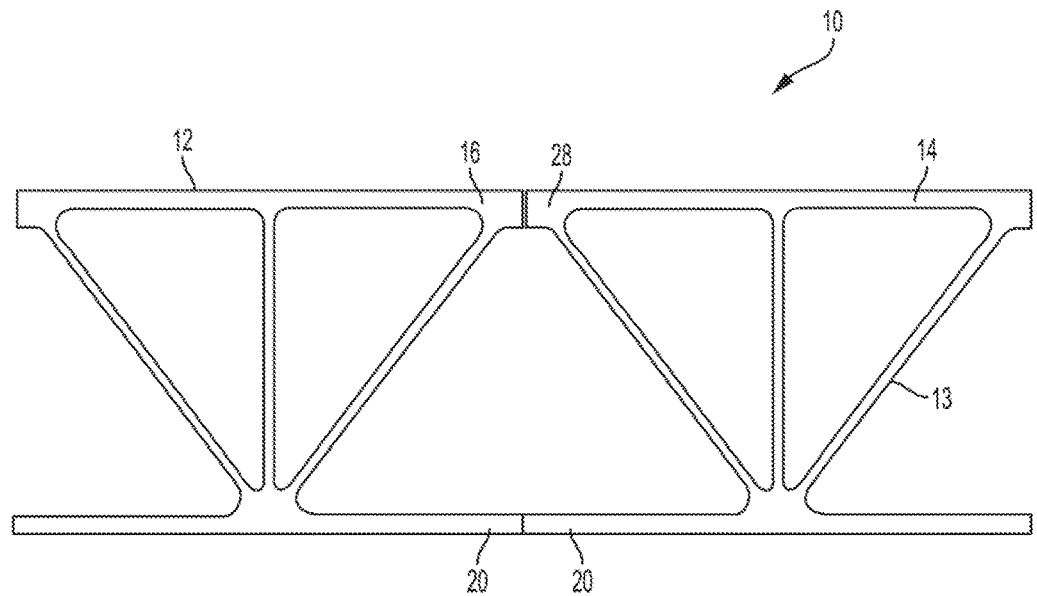
FIG. 6 is a vertical elevation view of mismatched abutments having thickness differences as between bridge decking panels resulting from the manufacturing extrusion process.

Referring now to FIG. 6, the abutment joint 24 between first member 12 and second member 14 is mismatched because the flange 28 of second member 14 is thicker than the flange 16 of the first member 12. A mismatched joint can be the result of material imperfections encountered through the manufacturing extrusion process. As viewed through the extrusion profile, the horizontal surface of first member 12 is uneven with the horizontal member of the second surface 14. This mismatch can create problems joining the members 12, 14 because when the pin 32 of a traditional FSW tool 30 is applied, the faying surface 24 of the thicker flange 28 will come into contact with the pin 32 prior to the thinner flange 16, causing the pin to bias to one side of the mismatch. Accordingly, the plasticization and intermixing will be inconsistent. Additionally, the thicker flange 28 may prevent the pin 32 of the FSW tool to penetrate all they way through the vertical length of the faying surface 24. Accordingly, the entire abutment joint may not result in a solid weld.

Likewise, a flange thickness mismatch, such as that seen in FIG. 6, can prevent the proper application of a self-reacting FSW tool 40 as well. Because the shoulders 42, 44 of a self-reacting FSW tool 40 must be spaced slightly further apart than the thickness of the flanges to which it is applied, a gap will exist between the thinner panel 16 and the shoulders 42, 44 of a self-reacting FSW tool 40. Because the shoulders 42, 44 of the self-reacting FSW tool 40 are meant to prevent the spread of plasticized material and help fill any void space left by the self-reacting pin, any gap existing between the flange and either of the shoulders 42, 44 will effectively render the benefits of a self-reacting FSW tool useless.

Figure 7:
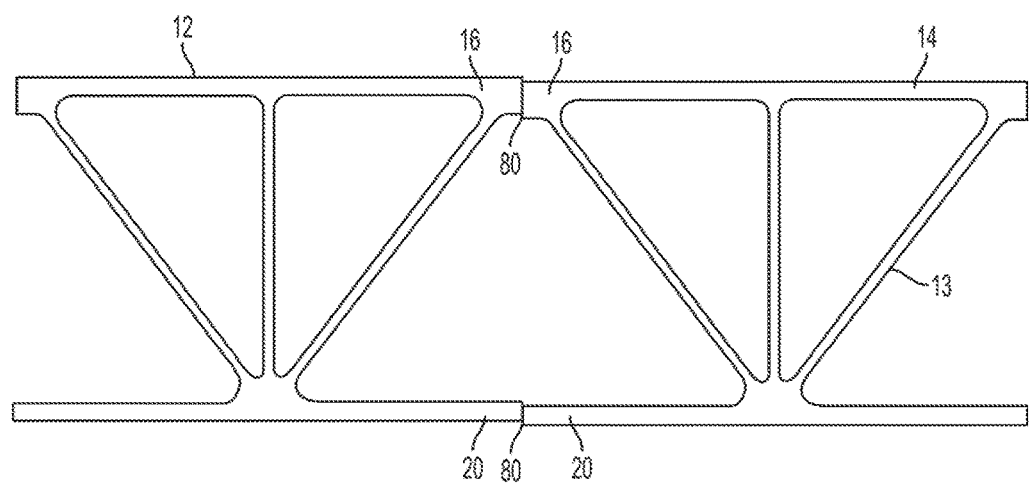
FIG. 7 is a vertical elevation view of offset abutments resulting from a failure to accurately align decking panels.

Turning to FIG. 7, the abutment joint 24 between first member 12 and second member 14 are mismatched because the vertical elevation of first member 12 and second member 14 have not been properly aligned. The result is vertical mismatch Y. Vertical mismatch is the distance by which a vertical abutment 24 of a first member 12 extends above or below the abutment 24 of a second member 14. In this respect, if each member 12, 14 has an upper panel that has a predetermined thickness value through which it is desired that an FSW tool imparts a weld, then any vertical mismatch Y, will decrease the thickness of the weld. In other words, the thickness of the welded area at abutment joints 24 will not be as thick as desired. This can result in strength deficiencies in the joined decking. Additionally, any vertical mismatch Y will also be present in the abutment joints 24 of the lower flanges 20. In applications where lower flanges 20 are significantly thinner than upper flanges 16, and the members 12, 14 have been vertically misaligned, then the thickness of the weld area at the abutment joint 24 of the lower flanges 20 is even more greatly decreased, proportional to its original intended thickness. Thus, where a vertical mismatch Y may be relatively insubstantial in comparison to the thicknesses of upper panels 16, the same vertical mismatch Y can decrease the proportional thickness of the weld line 24 in lower flanges 20 more substantially.

As discussed above, various problems occur as a result of the manufacturing extrusion process, which can make it difficult to employ typical FSW methods to bridge decking members of the prior art. Accordingly, a self-aligning structure is needed for the enhanced consistency of FSW welding applications to join structural decking.

Figure 8:
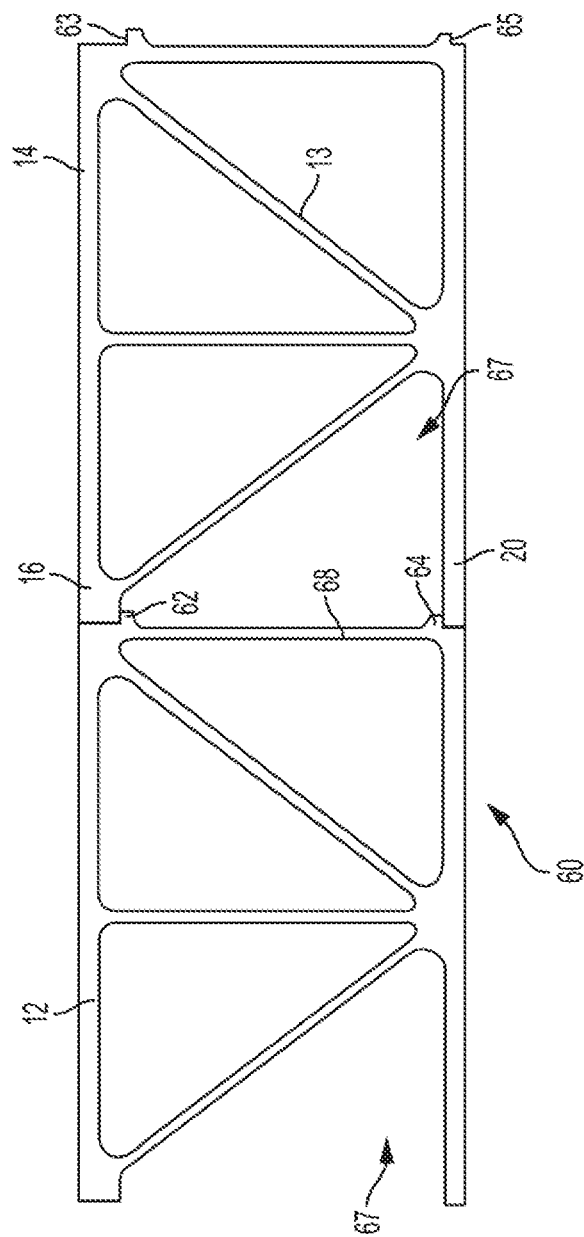
FIG. 8 is a vertical elevation view of bridge decking employing the self-aligning and internal support structure disclosed herein. However, the extrusions are not always identical as there may be a variety of geometries within the same structure.

Referring now to FIG. 8, a vertical extrusion profile of an improved self-aligning structure 60 for friction stir welding (FSW) applications is visible. In this embodiment, the self-aligning structure 60 comprises a first bridge decking member 12 having an upper panel 11 and a lower panel 15 connected by webbing members 13 therebetween. The self-alignment structure 60 further comprises a second bridge decking member 14 having an upper panel 11 and a lower panel 15 connected by webbing members 13 therebetween. The upper panel 11 of each bridge decking member further comprises a flange 16 which extends away from the center of the decking member. Additionally, the lower panel 11 of each member comprises a flange 20 which extends away from the center of the member. Each flange 16, 20 of each upper and lower panel 11, 15 of each member 12, 14 further comprises an end, which forms an abutment joint 24 with each flange 11, 15 of the neighboring member 12, 14.

As further seen in FIG. 8, the first decking member 12 may further comprise an upper 62 shelf extending horizontally beneath the abutment joint formed by the upper flanges 16 and a lower shelf 64 extending horizontally above the abutment joint formed by the lower flanges 20. Moreover, as seen in FIG. 8, the upper shelf 62 and lower shelf 64 may be connected by a vertical webbing member 68 therebetween. Additionally, FIG. 8 illustrates each decking member 12, 14 having a void space 67 between the upper panel 11 and lower panel 15 of each decking member. Employing an integral webbing member 68 obviates the need for a support anvil and increases the strength consistency of the joined decking members.

In one embodiment, as seen in FIG. 8, the void space 67 of the second decking member 14, is filled by the vertical webbing 68 member and upper and lower shelves 62, 64 of the first decking member 12. The upper shelf 62 of the first decking member 12 may optionally have an upwardly facing horizontal face that is in contact with the lower surface of the upper flange 16 of the second member 14. Similarly, the lower shelf 64 of the first decking member 12 may optionally have a downwardly facing horizontal face that is in contact with the upper surface of the lower flange 20 of the second member 14.

The embodiments of FIG. 8 further disclose the first bridge decking member 12 having webbing members 13 that alternate between an angled position and a vertical position to form a triangle. The embodiments depicted in FIG. 8 further disclose the second bridge decking member 14 having webbing members 13 that alternate between an angled position and a vertical position to form a triangle. Referring again to FIG. 8, in an embodiment, the alignment of the first decking member 12 and second decking member 14 cause for the vertical webbing member 68 connecting the upper and lower shelves 62, 64 of the first decking member 12 to continue the alternation of angled and vertical webbing 13 positions as between the first and second decking members 12, 14. Further, according to the embodiments of FIG. 8, the vertical webbing member 68 connecting the upper and lower shelves 62, 64 of the first decking member 12 forms a triangle in the void space 67 between the first and second decking members 12, 14.

In one embodiment, the self-aligning structure 60 for friction stir welding as illustrated by FIG. 8 and discussed above, further comprises extruded aluminum. Moreover, the self-aligning structure 60 for friction stir welding as illustrated by FIG. 8 and discussed above, optionally employs bridge decking members 12, 14 having a greater thickness of the upper panels 11 and a lesser thickness of the lower panels 15.

Although FIG. 8 illustrates the alignment of two neighboring decking members 12, 14, the present disclosure is not so limited. The improvements described herein may be self-contained a single decking member. The intention is that the self-contained decking member may be replicated and thereby sequentially align, optionally in perpetuity. This allows the improvements disclosed herein to be able to scale to meet larger projects.

Thus, according to FIG. 8, a self-aligning structure for friction stir welding applications 60 is disclosed. The self-aligning structure 60 may comprise a bridge decking member 12 with an upper panel 11 and a lower panel 15 connected by webbing members 13 therebetween. One side of the bridge decking member 12 may optionally comprise a void space between the upper panel 11 and the lower panel 15 and an other side of the decking member 12 may have a vertical webbing member 68 between the upper panel 11 and the lower panel 15. The self aligning structure 60 may further comprise an upper shelf 62 extending horizontally away from the vertical webbing member 68 operable to align a neighboring decking member, forming an upper abutment joint. Moreover, the self alignment structure 60 may comprise a lower shelf 64 extending horizontally away from the vertical webbing member 68 operable to align a neighboring webbing member, forming a lower abutment joint.

The self alignment structure 60 as embodied in FIG. 8, may further comprise a plurality of triangles formed by the webbing members 13 between the upper panel 11 and lower panel 15 of the decking member. The self alignment structure may further comprise a flange 16 with a blunt vertical end extending from the upper panel 11 on the side of the decking member 12 having the void space 67 and a flange 20 with a blunt vertical end extending from the lower panel 15 on the side of the decking member 12 having the void space 67. Moreover as depicted in FIG. 8, the self-alignment structure may further comprise two perpendicular abutment surfaces formed by the flange 16 of the upper panel 11 and upper shelf 62 extending from the side of the decking member 12 having a vertical webbing member 68, and two perpendicular abutment surfaces formed by the flange 20 of the lower panel 15 and lower shelf 64 extending from the side of the decking member 12 having a vertical webbing member 68.

Referring further to FIG. 8, in one embodiment, the blunt vertical end of the flange 16 extending from the upper panel 11 on the side of the decking member 12 having the void space 67 is configured to align with the two perpendicular abutment surfaces formed by the flange 16 of the upper panel 15 and the upper shelf 62 extending from the side of the decking member 12 having a vertical webbing member 68. Moreover, optionally the blunt vertical end of the flange 20 extending from the lower panel 15 on the side of the decking member 12 having the void space 67 is configured to align with the two perpendicular abutment surfaces formed by the flange 20 of the lower panel 15 and the lower shelf 64 extending from the side of the decking member 12 having a vertical webbing member.

As previously discussed, the self alignment structure 60 may be replicated, further comprising a second decking member 14, wherein the side of the replica structure 14 having a void space 67 is aligned with the side of the first structure 12 having the shelves 62, 64 and vertical webbing therebetween 68.

The self alignment structure 60 allows for two members 12, 14 to be aligned without further outside need to prevent mismatch or offset. This is because the upper self 62 of the first decking member 12 prevents the flange 16 of the upper plate 11 of the second decking member 14 from translating vertically downward. Moreover, the lower shelf 64 of the first decking member 12 prevents the flange 20 of the lower plate of the second decking member 14 from translating vertically upward. The existence of a vertical webbing member 86 between the upper and lower shelf 62, 64 obviates the need for an additional anvil. Accordingly, an FSW tool 30 may be applied to the upper abutment joint 24 without concern for deflection in the upper panels 11. The same concept applies for the lower abutment joint. Even though the flanges 20 of the lower panels 15 may not be as thick as the flanges 16 of the upper panels 11, the existence of the lower shelf 64 and vertical webbing member 68 ensures that application of the FSW tool 30 will not result in vertical deformity. Additionally, because the vertical webbing member 68 connects the void space 67 between the upper and lower panels 11, 15 of a second member 14, the likelihood of horizontal deformity is lessened. Because vertical webbing member 68 runs the horizontal length L of the extrusion profile, additional rigidity against horizontal and vertical deformity are added to the joined bridge decking members.

Many alterations and modifications may be made by those having ordinary skill in the art without departing from the spirit and scope of the embodiments disclosed and described herein. Therefore, it is understood that the illustrated and described embodiments have been set forth only for the purposes of examples and that they are not to be taken as limiting the embodiments as defined by the following claims. For example, notwithstanding the fact that the elements of a claim are set forth below in a certain combination, it must be expressly understood that the embodiments include other combinations of fewer, more or different elements, which are disclosed above even when not initially claimed in such combinations.

The definitions of the words or elements of the following claims are, therefore, defined in this specification to not only include the combination of elements which are literally set forth. It is also contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination(s).

Furthermore, to the extent that the term "having," "includes," or "wherein" is used in either the detailed description or the claims, such term is intended to be inclusive in a manner similar to the term "comprising" as "comprising" is interpreted when employed as a transitional word in a claim.

What is claimed is:

1. An aluminum decking structure configured to be assembled using friction stir welding, comprising
    a first bridge decking member having an upper and lower panel connected by webbing members therebetween,
    a second bridge decking member having an upper and lower panel connected by webbing therebetween,
    wherein the area of the upper panels extending away from the center of the first and second members comprise flanges with ends operable to form an abutment joints therebetween; and
    wherein the first bridge decking member further comprises an upper shelf extending horizontally beneath the abutment joint formed by the upper flanges; a lower shelf extending horizontally above the abutment joint formed by the lower flanges, and
    wherein the upper and lower shelf are connected by a vertical webbing member therebetween; and wherein the thickness of the aluminum forming the upper panel is thicker than the aluminum forming the lower panel.

2. The structure of claim 1, wherein the second decking member has a void space between the upper and lower panels, and wherein the void space is filled by the vertical webbing member and upper and lower shelves of the first decking member.

3. The structure of claim 2, wherein the upper shelf of the first decking member has a horizontal face and wherein the horizontal face is in contact with the lower surface of the upper flange of the second member.

4. The structure of claim 3, wherein the lower shelf of the first decking member has a horizontal face and wherein the horizontal face is in contact with the upper surface of the lower flange of the second member.

5. The structure of claim 4, wherein the webbing members of the first decking member form a triangle.

6. The structure of claim 4, further comprising extruded aluminum.

7. The structure of claim 4, wherein the webbing members of the first decking member alternate between an angled position and a vertical position.

8. The structure of claim 7, wherein the webbing members of the second decking member alternate between an angled position and a vertical position.

9. The structure of claim 8, wherein the vertical webbing member connecting the upper and lower shelves of the first decking member continue the alternation of angled positions and vertical positions as between the first and second decking members.

10. The structure of claim 7, wherein the webbing members of the second decking member form a triangle.

11. The structure of claim 10, wherein the vertical webbing member connecting the upper and lower shelves of the first decking member forms a triangle an angular webbing member of the second decking member in the void space of the second decking member.

12. A bridge decking structure configured to be assembled using friction stir welding, wherein the structure comprises
- a bridge decking member including an upper panel and a lower panel connected by webbing members therebetween,
- a side of the bridge decking member having a void space between the upper panel and the lower panel,
- an other side of the bridge decking member having a vertical webbing member between the upper panel and the lower panel,
- an upper shelf extending horizontally away from the vertical webbing member between the upper panel and lower panel operable to align an upper panel of a neighboring decking member, forming an upper abutment joint, and
- a lower shelf extending horizontally away from the vertical webbing member operable to align a lower panel of the neighboring webbing member, forming a lower abutment joint; and
- wherein each of the bridge decking member and the neighboring decking member include a webbing member extending at an angle between the upper and lower panels and terminating proximate to the upper abutment joint; and
- a flange with a blunt vertical end extending from the upper panel on the side of the neighboring decking member to rest on the upper shelf, wherein the height of the blunt vertical end is greater than the thickness of the upper panel and greater than the length of the upper shelf to thereby provide a weld joint thicker than the thickness of the upper panel.

13. The structure of claim 12, further comprising a plurality of triangles formed by the webbing members between the upper and lower panels.

14. The structure of claim 12, wherein the angular webbing members and the vertical webbing member form a pair of symmetrical triangles when viewed from an end of the bridge decking structure, and wherein the vertical webbing member forms a leg of both of the pair of symmetrical triangles.

15. The structure of claim 12, further comprising a flange with a blunt vertical end extending from the lower panel on the side of the neighboring decking member.

16. The structure of claim 15, further comprising two perpendicular abutment surfaces formed by the flange of the upper panel and upper shelf extending from the side of the decking member having a vertical webbing member, and two perpendicular abutment surfaces formed by the flange of the lower panel and lower shelf extending from the side of the decking member having a vertical webbing member.

17. The structure of claim 16, wherein the blunt vertical end of the flange extending from the upper panel on the side of the neighboring decking member is configured to align with the two perpendicular abutment surfaces formed by the flange of the upper panel and the upper shelf extending from the side of the decking member having a vertical webbing member.

18. The structure of claim 17, wherein the blunt vertical end of the flange extending from the lower panel on the side of the neighboring decking member is configured to align with the two perpendicular abutment surfaces formed by the flange of the lower panel and the lower shelf extending from the side of the decking member having a vertical webbing member.

19. A decking structure configured to be assembled using a friction stir welding process, wherein the structure comprises
- a decking member including an upper panel and a lower panel connected by webbing members therebetween,
- a side of the decking member having a void space between the upper panel and the lower panel,
- an other side of the decking member having a vertical webbing member between the upper panel and the lower panel,
- an upper shelf extending horizontally above from the vertical webbing member between the upper panel and lower panel operable to align an upper panel of a neighboring decking member, forming an upper abutment joint, and
- a lower shelf extending horizontally below from the vertical webbing member operable to align a lower panel of the neighboring webbing member, forming a lower abutment joint; and
- wherein the abutment joints including vertically and horizontally extending abutting surfaces and wherein the vertically extending abutting surfaces of the upper abutment joint are to be welded by the friction stir welding process to form a weld joint and wherein the vertical webbing member is aligned directly beneath the upper abutment joint and the vertically extending abutting surface to thereby provide support to the upper abutment joint from vertical forces applied during the friction stir welding process; and
- wherein each of the bridge decking member and the neighboring decking member include a webbing member extending at an angle between the upper and lower panels and terminating at one end proximate to the upper abutment joint and the vertical member and at the other end away from the lower abutment joint and the vertical member to thereby form a pair of triangles and provide support for the weld joint, and wherein the vertical member is a leg of both of the pair of triangles.

20. The decking structure of claim 19, wherein the decking member comprises aluminum and wherein thickness of the aluminum forming the upper panel is thicker than the aluminum forming the lower panel.

* * * * *